US006371090B1

United States Patent
Howell

(10) Patent No.: US 6,371,090 B1
(45) Date of Patent: Apr. 16, 2002

(54) VACUUM VAPOR INJECTOR

(76) Inventor: Daniel P. Howell, 11 Elm St., Sparta, MI (US) 49345

( * ) Notice: Subject to any disclaimer, the term of this patent is extended or adjusted under 35 U.S.C. 154(b) by 0 days.

(21) Appl. No.: 09/620,451

(22) Filed: Jul. 20, 2000

(51) Int. Cl.[7] .............................................. F02M 17/22
(52) U.S. Cl. ..................................................... 123/522
(58) Field of Search ........................................ 123/522

(56) References Cited

U.S. PATENT DOCUMENTS 4,345,568 A * 8/1982 Alegre et al. ............... 123/522

* cited by examiner

Primary Examiner—Tony M. Argenbright
Assistant Examiner—Katrina B. Harris

(74) Attorney, Agent, or Firm—John D. Gugliotta

(57) ABSTRACT

An engine fuel injection apparatus forms an airtight vaporization chamber having cylindrical sidewall and a flat, solid chamber bottom. A vapor fuel discharge line in fluid communication with the inside of the chamber. A fuel inlet orifice penetrates the sidewall through which a fuel line accesses the chamber, supplying fuel. The fuel supply line inside said chamber terminates with a float level controller such that a constant level of fuel is maintained in the chamber. Submersed below a level of the fuel to be maintained by the float level controller is an atomization device formed of a hollow, perforated plate near, but not at the chamber bottom. An air intake in fluid communication with the atomization device provides air intrusion. As fuel enters the bottom of the chamber from the fuel supply line coming from a fuel pump a mixture of fuel and air results and is sent to the fuel intake manifold of the vehicle.

7 Claims, 2 Drawing Sheets

VACUUM VAPOR INJECTOR

RELATED APPLICATIONS

The present invention was first described in Disclosure Document No. 425,795, filed on Oct. 7, 1997. There are no previously filed, nor currently any co-pending applications, anywhere in the world.

BACKGROUND OF THE INVENTION

1. Field of the Invention

The present invention relates generally to engine fuel bypasses to aspiration chambers and, more particularly, to a vacuum vapor injector for use with conventional carbureted internal combustion engine.

2. Description of the Related Art

In the related art, the automotive industry is in a constant search for methods and devices that will improve the fuel efficiency of their vehicles without sacrificing engine performance. Furthermore, governmental restrictions and guidelines serve to provide additional motivation to develop these products. The fruits of these efforts have consisted mainly of new fuel injected engines, computer controlled fuel supplies and emissions, and fuel additives.

A search of the prior art did not disclose any patents that read directly on the claims of the instant invention; however, the following references were considered related. There are several patents that disclose fuel atomizing apparatus for internal combustion engines wherein an impeller is placed between the carburetor and the intake manifold. The rotational motion of the impeller will further disperse and atomize the fuel entering the engine:

U.S. Pat. No. 1,498,859, issued in the name of Wekerle.
U.S. Pat. No. 2,216,722, issued in the name of Denson.
U.S. Pat. No. 2,354,373, issued in the name of Hanks.
U.S. Pat. No. 4,011,850, issued in the name of Knox, Sr.
U.S. Pat. No. 4,671,247, issued in the name of Barbee.

U.S. Pat. No. 3,968,781, issued in the name of Stephenson, discloses a fuel atomization device for use with internal combustion engines wherein a plurality of nozzles are placed between the carburetor and the intake manifold. The nozzles act to further disperse and atomize the fuel entering the engine.

U.S. Pat. No. 4,085,717, issued in the name of Willmann et al., discloses a fuel atomization device for use with internal combustion engines wherein the fuel is electrostatically charged and passed are drawn through a plurality of capillary tubes by a counter-electrode and into the combustion air stream, thus providing an atomized air-fuel mixture.

U.S. Pat. No. 4,162,281, issued in the name of Ingraham, discloses a fuel atomization device for use with internal combustion engines wherein an air compressor is used to supply the combustion air to the engine, thus improving the atomization of the gasoline in the air-fuel mixture.

U.S. Pat. No. 5,000,152, issued in the name of McCauley, discloses a fuel conservation device for use with internal combustion engines wherein a static vortex generator, an ultrasonic transducer, and an electrostatic charging grid are used to improve the atomization of the gasoline in the air-fuel mixture.

U.S. Pat. No. 5,053,170, issued in the name of Drahos, discloses a fuel atomization device for use with internal combustion engines wherein a venturi stack is placed between the carburetor and the intake manifold. The venturi acts to further disperse and atomize the fuel entering the engine.

U.S. Pat. No. 5,437,258, issued in the name of Williams et al., discloses a fuel atomization device for use with internal combustion engines wherein a stainless steel or copper screen is placed between the carburetor and the intake manifold. The screen acts to further disperse and atomize the fuel entering the engine.

Consequently, the present invention supplements these existing technologies by providing an add-on device that will enhance fuel economy without the need to eliminate existing devices.

SUMMARY OF THE INVENTION

Therefore, it is an object of the invention to provide a system that supplements the fuel system of a conventional internal combustion engine by creating a source of air/fuel supplementation.

Briefly described according to one embodiment of the present invention, the vapor injection unit enhances this mixture of fuel and air by adding an airtight vaporization chamber to the fuel system. Fuel enters the bottom of the chamber from the fuel supply line coming from the fuel pump. Valves are provided to allow the user to tune the amount of fuel supplied to the unit. There is also a discharge line exiting from the top of the unit to the intake manifold. A constant level of fuel is maintained in the chamber by the incorporation of a float that regulates whether fuel is permitted to enter. Submersed in the fuel is an atomization device, connected to the outside air via an air line, and containing a plurality of small holes. The amount of air entering the chamber is tunable via an air valve. The vacuum from the intake manifold draws the outside air in through the air line, creating air bubbles that travel through the fuel. As the bubbles reach the surface, a mixture of fuel vapor and air results and is sent to the intake manifold, ideally improving the fuel efficiency of the engine.

An advantage of the present invention is that it supplements the fuel system of an otherwise conventional internal combustion engine.

Another advantage of the present invention is that it installs as an addition to the fuel system.

Another advantage of the present invention is that it incorporates a vaporization chamber that creates a source for air/fuel supplementation.

Yet another advantage of the present invention is that only one "moving" part is utilized, thereby allowing for a minimum of potential mechanical wear and failure.

A final advantage of the present invention is that it utilizes engine vacuum, thereby requiring no external power supply.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
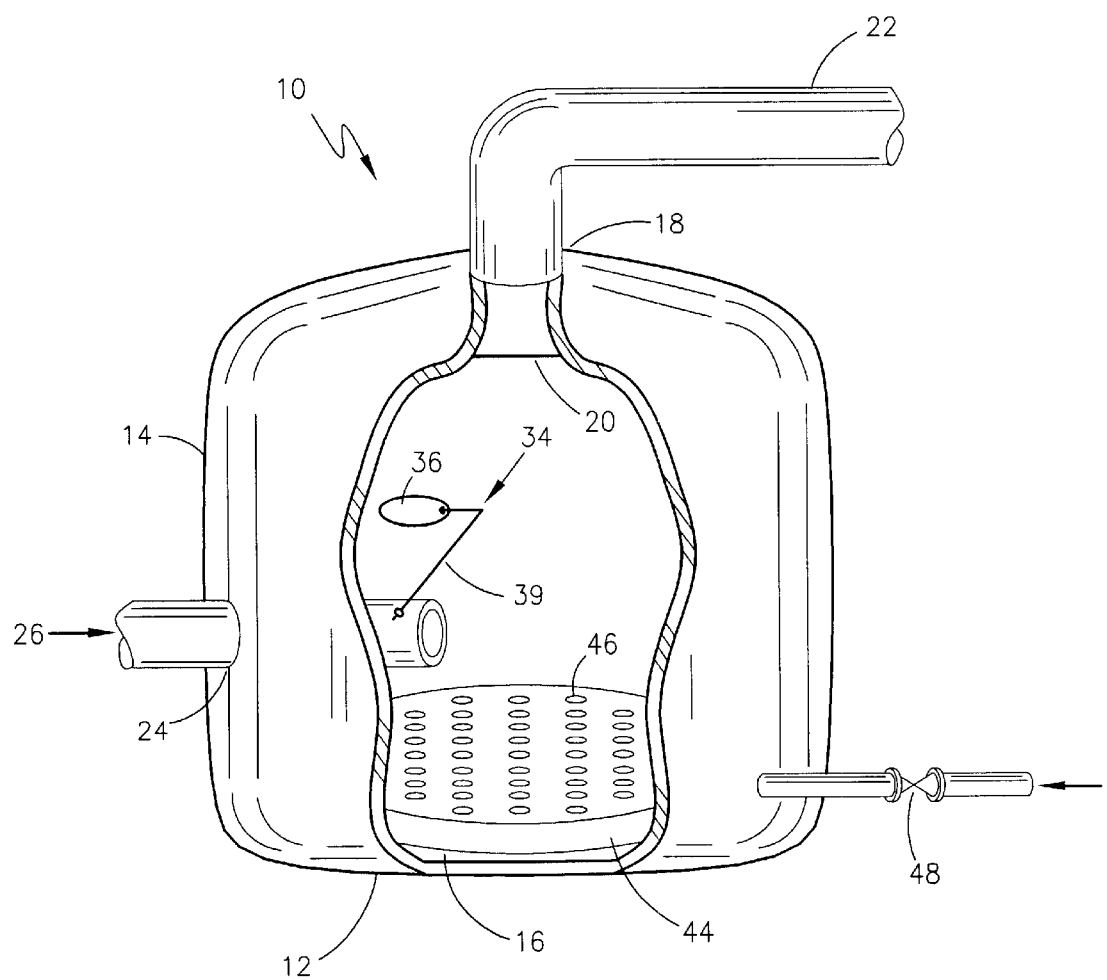
FIG. 1 is a perspective view of a vacuum vapor injector according to the preferred embodiment of the present invention.
Figure 2:
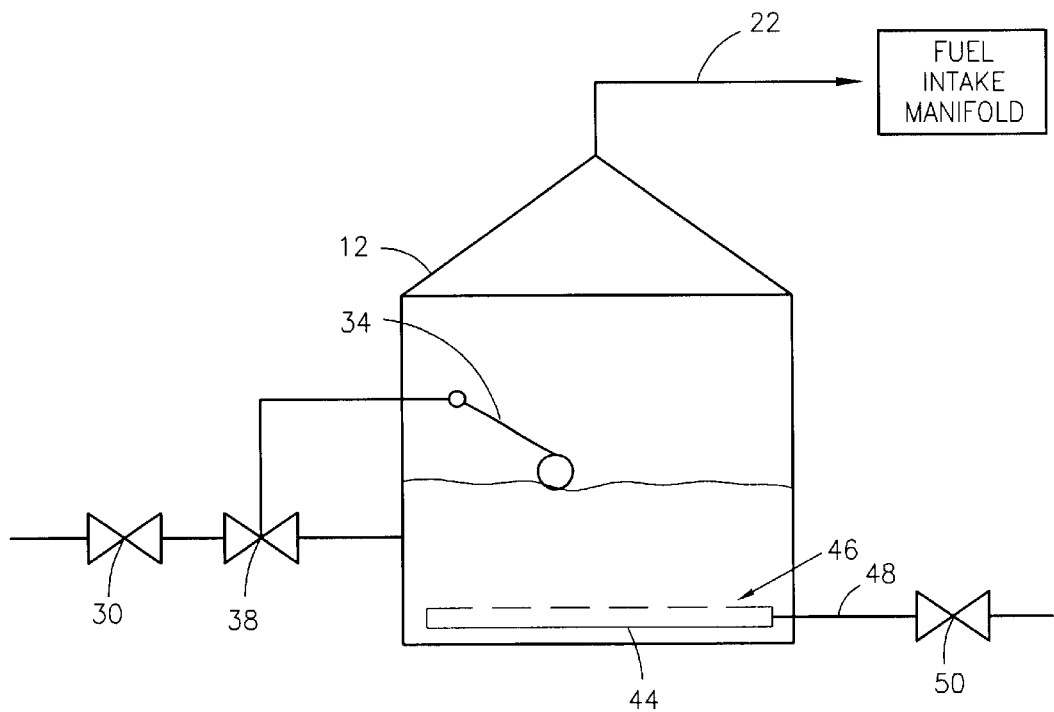
FIG. 2 is a schematic functional diagram thereof.

Referring now to FIGS. 1–2, a vacuum vapor injection unit 10 is provided according to the preferred embodiment of the present invention, designed to enhance the mixture of fuel and air by adding an airtight vaporization chamber 12 to the fuel System. The chamber 12 is formed of a generally cylindrical sidewall 14 and having a flat, solid chamber bottom 16 at the lower end and peaks at an apex 18 at the upper end. Although the embodiment shown indicates a generally dome-shaped upper end, it is also anticipated that an angular, peaked apex could provide a sufficient funnel-like collecting area 20 for functioning as a fluid communication inlet to the vapor fuel discharge line 22 as will be described in greater detail below.

Penetrating the sidewall 14 is a fuel inlet orifice 24 through which a fuel line 26 accesses the inside of the chamber 12 to provide gasoline from the fuel supply system of a vehicle. As such, it is envisioned that the fuel enters the bottom of the chamber 12 from the fuel supply line 26 coming from the fuel pump (not shown). Additionally, it is envisioned that a gasoline pre-heater can be formed by utilizing the operational heat of the motor itself by directing the fuel line near an existing heat source or, alternately, providing a wrap-around gasoline pre-heater to function as a heat conduit to the fuel line. Although not integral to the operation of the present invention, for practical versatility it is felt that a manual fuel adjustment valve 30 is provided within the fuel supply line 26 to allow the user to tune the amount of fuel supplied to the unit. Terminating the fuel supply line 26 inside the chamber 12 is a float level controller 34. Consisting of a buoyant control float 36 in mechanical connection with an on/off control valve 38 by a control arm 39 such that a constant level of fuel is maintained in the chamber 12 as the float 36 regulates whether fuel is permitted to enter by opening or closing the on/off control valve 38 respectively.

Figure 3:
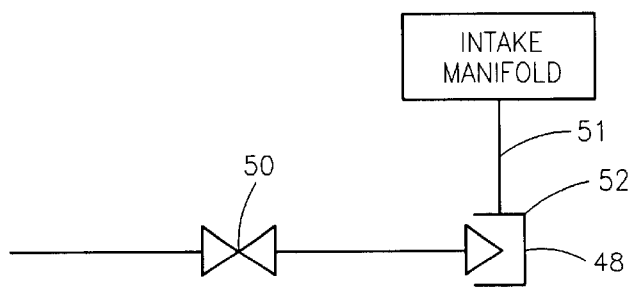
FIG. 3 is a schematic functional diagram of a vacuum injection system for use therewith.

Submersed below the level of the fuel to be maintained by the float level controller 34 is an atomization device 44. The atomization device 44 is envisioned as a hollow plate formed within the chamber 12 near, but not at the chamber bottom 16. The hollow plate further has a plurality of atomizing orifices 46 for providing fluid communication between the internal cavity of the plate and the inner volume of the chamber 12. Also penetrating the outer sidewall 14 and in connecting to, and in fluid communication with the atomization device 44 is an air intake line 48, which is connected to the outside. As shown in conjunction with FIG. 3, the amount of air entering the chamber 12 is tunable via a manual air adjustment valve 50. Alternately, it is envisioned that the air adjustment valve 50 can be coupled or otherwise associated with the acceleration pedal in order to provide functionality adjustable with the speed of the vehicle. The vacuum from the intake manifold through a vacuum line 51 draws the outside air in through a venturi 52 the air intake line 48, creating air bubbles that travel through the fuel. As the bubbles reach the surface, they collect in the collecting area 20 and are forced into the vapor fuel discharge line 22, exiting from the top of the unit to the fuel intake manifold (not shown) of the vehicle.

The mixture of fuel and air results and is sent to the fuel intake manifold of the vehicle, ideally improving the fuel efficiency of the engine.

As designed, a device embodying the teachings of the present invention is easily applied. The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Additionally, many alterations of the best mode are envisioned to allow for accommodating the teachings of the present disclosure within additional improvements. By way of example, and not by way of limitation, it is foreseen that the use of the vacuum vapor injector can be used to bypass all previous fuel supply systems, with these conventional systems augmented or even isolated once the engine is operating in use. In this case, the vacuum required to operate the injector can be obtained from the warm air from the valve covers. In such an instance, the addition of a pre-heater would be required to upgrade the air temperature from about 145° F., as available within an operating valve cover cavity, to about 190° F., as is required herein. Consequently, the scope of the invention is to be broadly limited only by the following claims.

What is claimed is:

1. An engine fuel injection apparatus comprising:
   an airtight vaporization chamber formed of a generally cylindrical sidewall and having a flat, solid chamber bottom at a lower end and peaks at a dome-shaped, peaked apex at an upper end forming a collecting area;
   vapor fuel discharge line in fluid communication with said collecting area; and
   a fuel inlet orifice penetrating said sidewall through which a fuel line accesses said chamber, said fuel inlet orifice also in fluid communication with a fuel supply line coming from a fuel pump of an otherwise conventional gasoline engine; wherein as fuel enters the bottom of the chamber from the fuel supply line coming from a fuel pump a mixture of fuel and air results and is sent to the fuel intake manifold of the vehicle, wherein terminating said fuel supply line inside said chamber is a float level controller comprising:
   a buoyant control float; and
   an on/off control valve in mechanical connection with said float level controller by a control arm such that a constant level of fuel is maintained in said chamber as said float regulates whether fuel is permitted to enter by opening or closing said on/off control valve respectively,
   wherein submersed below a level of the fuel to be maintained by said float level controller is an atomization device, said atomization device comprising a hollow plate formed within said chamber near, but not at said chamber bottom.

2. The engine fuel injection apparatus of claim 1, wherein said hollow plate further comprises a plurality of atomizing orifices for providing fluid communication between the internal cavity of the plate and the inner volume of the chamber.

3. The engine fuel injection apparatus of claim 1, further comprising:
   an air intake line penetrating said outer sidewall and in connecting to, and in fluid communication with said atomization device, wherein said air intake line provide air intrusion into said cavity; and
   an air adjustment valve in fluid communication with said air intake line for controlling the air flow there through.

4. An engine fuel injection apparatus comprising:
   an airtight vaporization chamber formed of a generally cylindrical sidewall and having a flat, solid chamber bottom at a lower end and dome-shaped, peaked apex forming a funnel-like collecting area at an apex at an upper end;
   vapor fuel discharge line in fluid communication with said collecting area; and a fuel inlet orifice penetrating said sidewall through which a fuel line accesses said chamber, said fuel inlet orifice also in fluid communication with a fuel supply line coming from a fuel pump of an otherwise conventional gasoline engine;

a manual fuel adjustment valve within the fuel supply line to allow the user to tune the amount of fuel supplied to said fuel inlet orifice;

a float level controller terminating said fuel supply line inside said chamber comprising buoyant control float; and an on/off control valve in mechanical connection with said float level controller by a control arm such that a constant level of fuel is maintained in said chamber as said float regulates whether fuel is permitted to enter by opening or closing said on/off control valve respectively, wherein submersed below a level of the fuel to be maintained by said float level controller is an atomization device, said atomization device comprising a hollow plate formed within said chamber near, but not at said chamber bottom.

5. The engine fuel injection apparatus of claim 4, wherein said hollow plate further comprises a plurality of atomizing orifices for providing fluid communication between the internal cavity of the plate and the inner volume of the chamber.

6. The engine fuel injection apparatus of claim 5, further comprising:

an air intake line penetrating said outer sidewall and in connecting to, and in fluid communication with said atomization device, wherein said air intake line provide air intrusion into said cavity.

7. The engine fuel injection apparatus of claim 6, further comprising an air adjustment valve in fluid communication with said air intake line for controlling the air flow there through.

\* \* \* \* \*